(12) United States Patent
Everson et al.

(10) Patent No.: US 8,244,249 B1
(45) Date of Patent: Aug. 14, 2012

(54) METHODS AND SYSTEMS FOR A MESH-NETWORK TAKEOVER

(75) Inventors: John M. Everson, Leawood, KS (US); Jason R. Delker, Olathe, KS (US); Jeremy G. Titus, Spring Hill, KS (US); James W. Norris, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 761 days.

(21) Appl. No.: 11/716,095

(22) Filed: Mar. 9, 2007

(51) Int. Cl.
*H04W 36/00* (2009.01)
(52) U.S. Cl. ............... 455/436; 455/422.1; 455/439; 370/331; 370/332
(58) Field of Classification Search ............ 370/338, 370/331, 329, 332; 455/438–439
See application file for complete search history.

(56) References Cited

U.S. PATENT DOCUMENTS

| | | | |
|---|---|---|---|
| 6,842,460 B1 | 1/2005 | Olkkonen et al. | |
| 6,950,859 B1 | 9/2005 | Bartek et al. | |
| 7,127,541 B2 | 10/2006 | Govindarajulu et al. | |
| 7,136,904 B2 | 11/2006 | Bartek et al. | |
| 7,502,354 B1 | 3/2009 | Maufer | |
| 2002/0103893 A1 | 8/2002 | Frelechoux et al. | |
| 2002/0194384 A1 | 12/2002 | Habetha | |
| 2003/0129982 A1* | 7/2003 | Perini | 455/442 |
| 2003/0224787 A1 | 12/2003 | Gandolfo | |
| 2004/0022226 A1* | 2/2004 | Edlund et al. | 370/338 |
| 2004/0122649 A1 | 6/2004 | Bartek et al. | |
| 2005/0135268 A1 | 6/2005 | Simon et al. | |
| 2005/0138359 A1 | 6/2005 | Simon et al. | |
| 2005/0232212 A1* | 10/2005 | Kang et al. | 370/338 |
| 2006/0111111 A1* | 5/2006 | Ovadia | 455/439 |
| 2006/0159033 A1 | 7/2006 | Suzuki et al. | |
| 2006/0160555 A1 | 7/2006 | Kobayashi et al. | |
| 2006/0168446 A1 | 7/2006 | Ahonen et al. | |
| 2007/0189249 A1 | 8/2007 | Gurevich et al. | |
| 2007/0206537 A1 | 9/2007 | Cam-Winget et al. | |

(Continued)

FOREIGN PATENT DOCUMENTS

EP   1 517 490   3/2005

(Continued)

OTHER PUBLICATIONS

Trezentos et al, "Algorithms for Ad-hoc Piconet Topology Initialization", Vehicular Technology Conference, 2003, VTC 2003-Fall, IEEE VOI. 5, p. 3449.*

(Continued)

*Primary Examiner* — Rafael Pérez-Gutiérrez
*Assistant Examiner* — Neda Behrooz

(57) ABSTRACT

Methods and systems for a mesh-network takeover are provided. In one embodiment, a first controller having a first attribute and a first group of nodes in its network receives a message from a node in the first group. The message indicates that the node in the first group received a signal from a node that is in a second group and associated with a second controller having a second attribute. Further, the message includes the second attribute. Responsive to receiving the message, the first controller compares the first attribute with the second attribute. As a result of comparing the first attribute with the second attribute, the first controller makes a determination that it has a lower priority than the second controller. Responsive to making the determination, the first controller no longer communicates with the first group, resulting in at least one node in the first group joining the second network.

18 Claims, 13 Drawing Sheets

U.S. PATENT DOCUMENTS

2008/0112363 A1     5/2008    Rahman et al.

FOREIGN PATENT DOCUMENTS

EP         1 545 073         6/2005

OTHER PUBLICATIONS

International Search Report and Written Opinion of International Searching Authority from International Application No. PCT/US2007/087463, dated Apr. 22, 2008.

Radhakrishnan et al., "Protocol for Dynamic Ad-Hoc Networks Using Distributed Spanning Trees," Wireless Networks 9, 673-686, 2003.

Office Action from U.S. Appl. No. 11/652,913, dated Jun. 5, 2009.

U.S. Appl. No. 11/652,912, filed Jan. 11, 2007.

Office Action from U.S. Appl. No. 11/652,912, dated Nov. 18, 2009.

Office Action from U.S. Appl. No. 11/652,912, dated Jan. 27, 2010.

Office Action from U.S. Appl. No. 11/652,912, dated May 20, 2010.

Office Action from U.S. Appl. No. 11/652,912, dated Oct. 4, 2010.

\* cited by examiner

200b

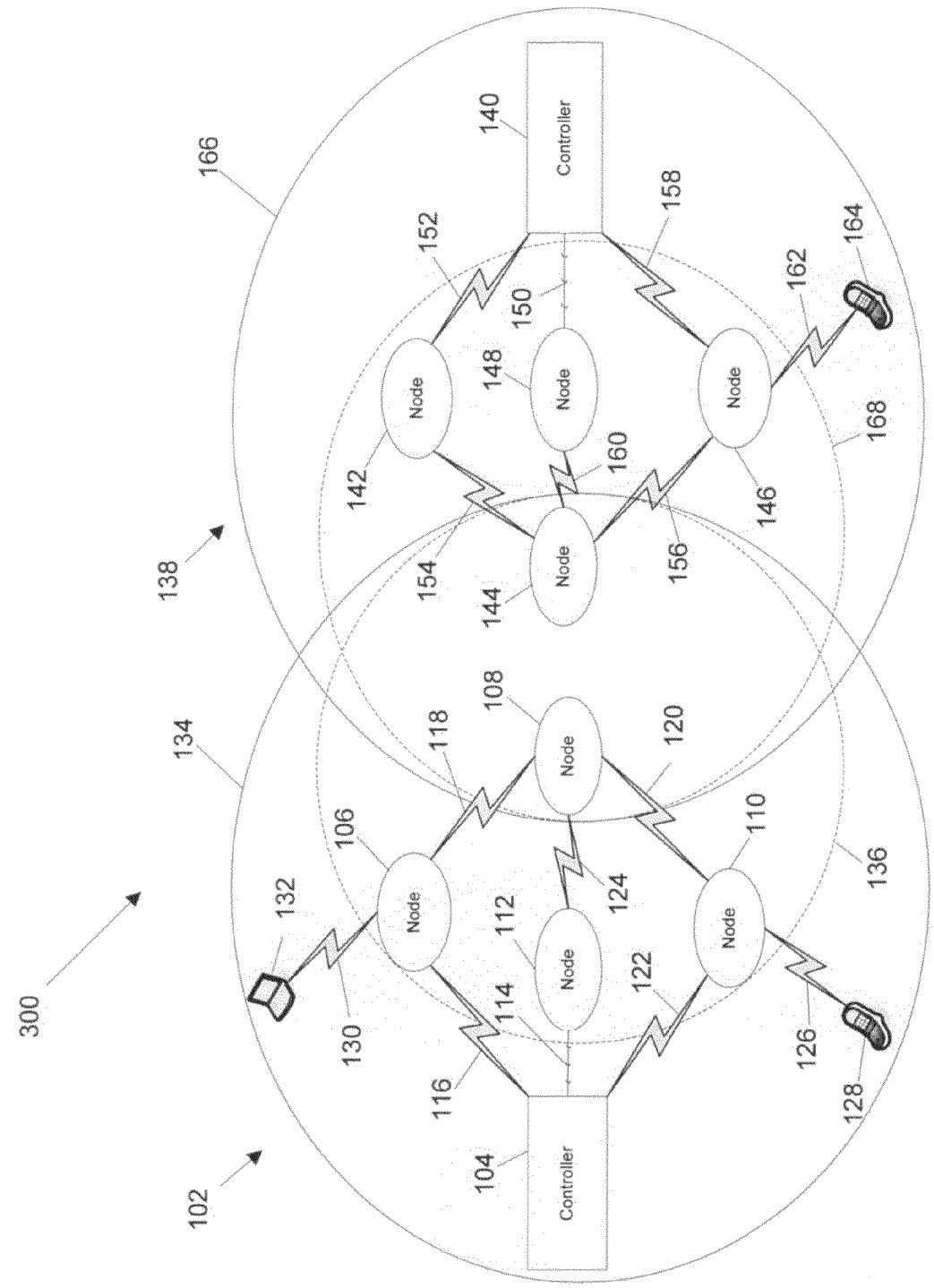

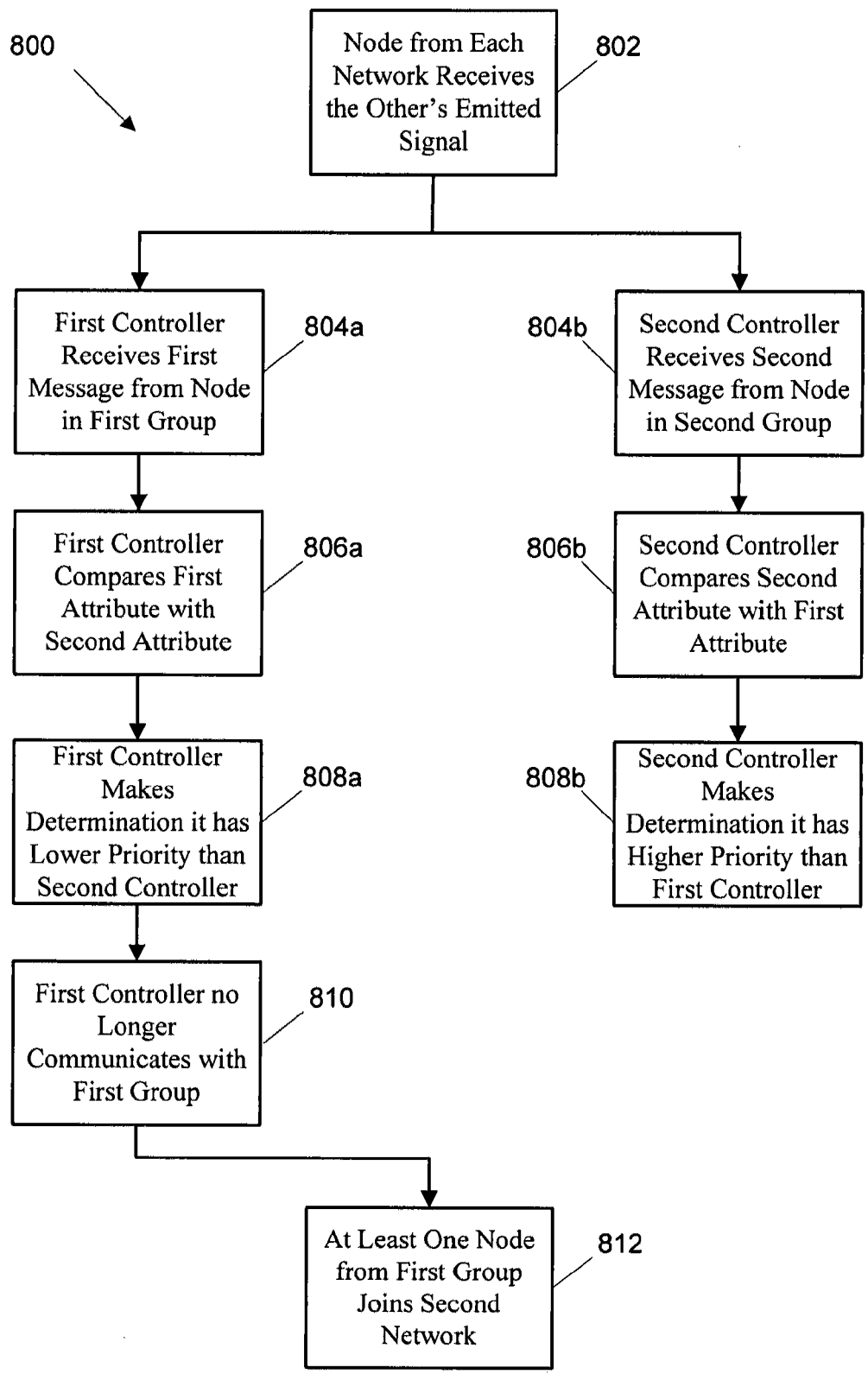

METHODS AND SYSTEMS FOR A MESH-NETWORK TAKEOVER

FIELD OF THE INVENTION

The present invention relates to wireless communications and, more particularly, to the arrangement and operation of wireless mesh networks.

BACKGROUND

Wireless-mesh-network technology has become increasingly popular in recent years. As a general matter, a wireless mesh network comprises a plurality of nodes that wirelessly communicate with each other and thereby provide paths to route communications from one point to another. In a typical arrangement, each node of a mesh network is a Wi-Fi (e.g., 802.11, Bluetooth, or other long or short-range wireless protocol) access point (AP) that is individually capable of serving Wi-Fi client devices such as personal computers, Wi-Fi phones, and the like. Further, the nodes of the mesh network are arranged to communicate with each other, so as to define inter-node links or "hops" through which client communications can pass. At least one of the nodes may also function as an "edge node" of the mesh network, in that the node has a broadband or other connection to an external network such as the Internet.

With this configuration, a client device can establish communications with a nearest access point in the network and can then communicate through the network with other clients served by the network or with entities on the external network. Communications from the client device would pass to its current serving node and then through any available communication path among mesh-network nodes to ultimately reach the destination client or external network. Likewise, communications from another client device or from the external network may pass through any available communication path among nodes in the mesh network to ultimately reach the serving node and, in turn, the destination client device.

In general, each node of a wireless mesh network typically has a network address, such as an Internet Protocol (IP) address, and a physical address, such as a Media Access Control (MAC) address. Using well-known network-routing principles, the nodes alert each other of their IP addresses and their available connections, and each node maintains an Address Resolution Protocol (ARP) table that maps MAC addresses to IP addresses, and generally establishes which hops are available for routing communications. Thus, when a node receives a communication destined for a particular IP address, the node can determine which next node should receive the communication and can send the communication to that next node, and so forth until the communication reaches its destination.

In general, a Wi-Fi access point regularly emits Wi-Fi signals (e.g., Wi-Fi beacons or pilot signals) that designate the access point's service set identifier (SSID), MAC address, and perhaps other information. In basic operation, when an access point or other Wi-Fi node detects such Wi-Fi signals, the access point or node can use the information in the signals to establish connectivity with the broadcasting access point, so as to communicate with it. Further, when an access point or other Wi-Fi node is seeking to find or associate with an access point or network, the node will broadcast a "discovery message" (using, e.g., the Lightweight Access Point Protocol) that provides any other nodes in its range with pertinent information such as the node's MAC address, for example. In basic operation, another node that detects such a discovery message may then programmatically use that information to establish connectivity with the broadcasting access point, so as to communicate with it.

A wireless mesh network may also include a central network controller ("controller"), which functions to manage the network, such as to direct the mesh-network nodes to use certain configuration data, such as particular SSIDs, radio channels, power levels, and/or other network settings, manage what nodes are allowed to function as members of the mesh network, monitor the airwaves for unknown nodes, allow clients to join the network, and/or perform other functions. The controller may be embodied in one of the access points in the mesh network, or in a separate unit connected through a wireless and/or wired link with at least one of the mesh-network nodes. Like other elements of the mesh network, the controller may have an IP address and MAC address in the mesh network. Further, the controller may have a unique, designated controller ID, which distinguishes it from controllers in other mesh networks. In a mesh network that includes such a controller, the access-point nodes of the network may include the controller ID in their Wi-Fi beacons, together with parameters such as those noted above.

SUMMARY

Methods and systems for a mesh-network takeover are provided. In one embodiment, the invention could take the form of a method. In accordance with the method, a second mesh network ("second network") takes over at least one node initially associated with a first mesh network ("first network").

According to one embodiment, in a communications system having (i) a first network that includes a first controller having a first attribute, the first network also initially including a first group of at least one mesh-network node ("node"), and also having (ii) a second network that includes a second controller having a second attribute, the second network also initially including a second group of at least one node, the first controller receives a message from a given node in the first group. The message may indicate that the given node in the first group received a signal from a given node in the second group. In addition, the message may include the second attribute. Responsive to receiving the message, the first controller may then compare the first attribute with the second attribute. As a result of comparing the first attribute with the second attribute, the first controller may make a determination that it has a lower priority than the second controller. Responsive to making the determination, the first controller may no longer communicate with the first group, resulting in at least one node in the first group joining the second network. In another embodiment, the first controller may direct at least one node in the first group to disassociate from the first network.

These as well as other aspects and advantages will become apparent to those of ordinary skill in the art by reading the following detailed description, with appropriate reference to the accompanying drawings.

BRIEF DESCRIPTION OF THE DRAWINGS

Embodiments of the invention are described herein with reference to the drawings, in which:

FIG. 3 is a block diagram depicting a network arrangement in which an embodiment of the invention can be implemented;

FIG. 8 is a flow chart provided to illustrate some of the functions that may be carried out in accordance with an embodiment of the invention.

DETAILED DESCRIPTION

I. Overview

Figure 1:
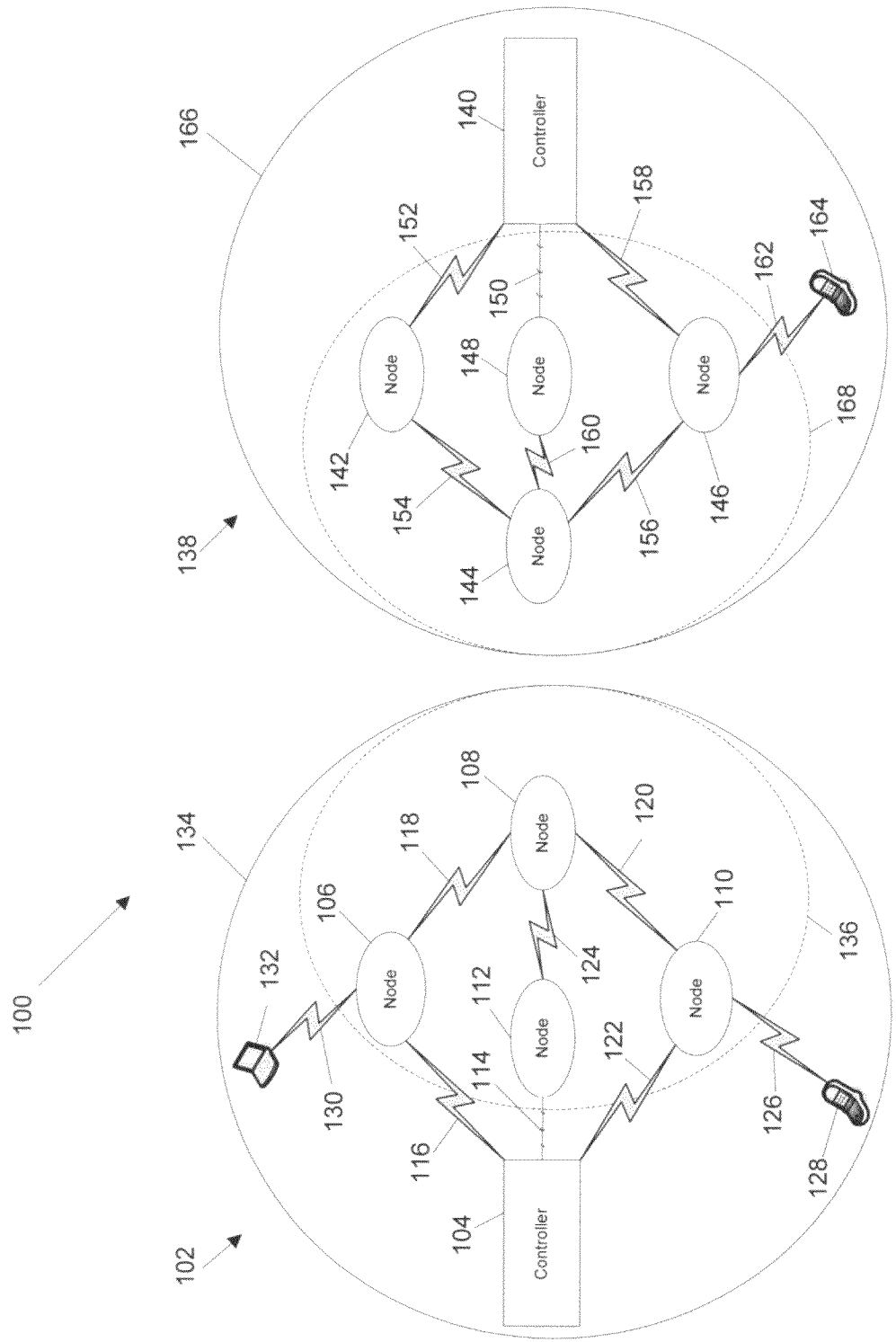
FIG. 1 is a block diagram depicting a network arrangement in which an embodiment of the invention can be implemented.

At times, it may be desirable for one mesh network to take over one, more than one, or perhaps all of the nodes of another mesh network. This may occur, for instance, in a disaster recovery scenario, where vehicles containing nodes are brought into the area to facilitate emergency communication through a mesh network, and where multiple such mesh networks may be established. Each mesh network may generally define a respective network coverage area or "bubble." It is possible through movement of the nodes or for other reasons that the bubble defined by one such mesh network may overlap with the bubble defined by another such mesh network.

Further, each mesh network may include a controller and initially include a group of one or more nodes associated with the controller. Each controller may store an attribute that provides an indication of the priority of the controller. Each attribute may include one or more values, such as a priority level, a backhaul value (indicating whether the controller has a backhaul connection to a packet-switched network), and/or other parameter(s). In certain cases, a controller of one mesh network may have a higher priority than a controller of another mesh network, as indicated by their respective attributes.

For instance, a first network, which (i) includes a first controller having a first attribute and (ii) also initially includes a first group of at least one node, may overlap with a second network, which (i) includes a second controller having a second attribute and (ii) also initially includes a second group of at least one node. When the first and second networks overlap, at least one node in the first group may detect the presence of the second network by receiving a Wi-Fi signal from at least one node in the second group. In addition, the Wi-Fi signal emitted by the node in the second group may include the attribute of the second controller, and perhaps configuration data of the second network.

The first controller may receive a message from the node in the first group, the message indicating that the node in the first group received the Wi-Fi signal from the node in the second group. Further, the message may include the second attribute and may also include second-network configuration data. Responsive to receiving the message from the node in the first group, the first controller may then compare the first attribute with the second attribute. As a result of comparing the first attribute with the second attribute, the first controller may make a determination that it has a lower priority than the second controller.

In one embodiment, responsive to making the determination that the first controller has a lower priority than the second controller, the first controller no longer communicates with the first group, resulting in at least one node in the first group joining the second network. When the first controller no longer communicates with the nodes in the first group, those nodes may consider themselves to be no longer members of a mesh network. Consequently, they may enter into a discover mode, in which they will search for a network to join. Thus, each node no longer served by the first controller may broadcast a discovery message. For each such node, the discovery message may then be detected by a node in the second group, which may then pass a message to the second controller, the message perhaps including the discovery message. Responsive to receiving the message, the second controller may then authorize one or more nodes in the first group to join the second network. Through this process, the nodes in the first group will begin to join the second network, and ultimately the vast majority or all of the nodes will become served by the second controller.

In another embodiment, responsive to making the determination that the first controller has a lower priority than the second controller, the first controller may direct at least one node in the first group to disassociate from the first network. The node in the first group will then broadcast a discovery message, which would be detected by a node in the second group. Through the processes described above, the node in the first group would join the second network. Alternatively or additionally, the first controller may direct the node in the first group to join the second network, such as by reconfiguring the node in the first group to store the second-network configuration data, so as to enable the node in the first group to operate on the second network. This process would then iteratively continue, with more and more nodes of the first group joining the second network, until the vast majority or all of the nodes in the first group have joined the second network, thus substantially completing the takeover of the nodes of the first network.

Further, in addition to the first controller receiving a message from the node in the first group, the second controller may receive a message from a node in the second group, the message indicating that the node in the second group received a Wi-Fi signal from a node in the first group. Further, the message may include the first attribute, and may also include first-network configuration data. Responsive to receiving the message from the node in the second group, the second controller may then compare the second attribute with the first attribute. As a result of comparing the second attribute with the first attribute, the second controller will make a determination that it has a higher priority than the first controller.

Advantageously, in accordance with an exemplary embodiment of the invention, both the first controller and the second controller make the same determination as to which controller has a higher priority, because they each apply the same logic for selecting the controller with the higher priority based on a comparison of the first and second attributes. Therefore, both controllers will agree that, in this scenario, the second controller has a higher priority than the first controller, and that the second controller will therefore take over at least one node in the first group.

II. Exemplary System Architecture

An embodiment of the present invention may be carried out in a system 100 as shown in FIG. 1. As illustrated, the system 100 includes two mesh networks, namely, a first mesh network 102 and a second mesh network 138.

Mesh network 102 includes a controller 104 and nodes 106, 108, 110, and 112. The nodes 106, 108, 110, and 112 may cooperatively define a first group of nodes. Controller 104 is communicatively coupled to the nodes 106 and 110 via wireless communication links 116 and 122, respectively, and node 112 via a wired communication link 114. Further, node 108 is communicatively coupled to nodes 106, 112, and 110 via wireless communication links 118, 124, and 120, respectively. Also, node 110 is communicatively coupled to a client device 128 via a wireless communication link 126, and node 106 is communicatively coupled to a client device 132 via a wireless communication link 130.

Additionally, node 108 defines a coverage area, or bubble, 136, which may comprise radiation patterns emitted by node 108. More generally, coverage area 136 may comprise a geographical area surrounding node 108. Entities within range of the geographical area associated with coverage area 136 may communicate with node 108. Furthermore, entities outside the range of the geographical area may still communicate with node 108, so long as a communication path exists between node 108 and the entity. For instance, as depicted in FIG. 1, coverage area 136 of node 108 encompasses nodes 106, 112, and 110. As such, node 108 may communicate with each of these devices. Additionally, although coverage area 136 of node 108 does not encompass client device 128, for instance, the coverage area (not depicted) of node 110 does encompass that client device. As such, node 108 and client device 128 may communicate via a communication path traversing node 110. Node 108 may also communicate with controller 104 via a communication path traversing node 106, 112, and/or 110.

Further, each of the nodes 106, 108, 110, and 112 may define more than one coverage area. For instance, node 108 may comprise a backhaul radio for communicating with other nodes and/or a controller, and a client radio for communicating with client devices. The backhaul radio and client radio of node 108 may each define their own coverage area (not individually depicted), and the coverage areas may vary in size and shape.

Similarly, mesh network 102 also defines a coverage area 134, which may comprise radiation patterns cooperatively emitted by controller 104 and each of the nodes 106, 108, 110, and 112. Entities within range of the geographical area associated with coverage area 134 are necessarily within the coverage area of at least one of controller 104 and nodes 106, 108, 110, and 112. If an entity comes within range of the coverage area of at least one of controller 104 and nodes 106, 108, 110, and 112, the entity may then form a communication path, and thus communicate with, the other entities associated with mesh network 102 (i.e., controller 104, each of the nodes 106, 108, 110, and 112, and each of the client devices 128 and 132).

Likewise, mesh network 138 comprises a controller 140 and nodes 142, 144, 146, and 148. The nodes 142, 144, 146, and 148 may cooperatively define a second group of nodes. Controller 140 is communicatively coupled to the nodes 142 and 146 via wireless communication links 152 and 158, respectively, and node 148 via a wired communication link 150. Further, node 144 is communicatively coupled to nodes 142, 148, and 146 via wireless communication links 154, 160, and 156, respectively. Also, node 146 is communicatively coupled to a client device 164 via a wireless communication link 162.

Additionally, node 144 defines a coverage area 168, which may comprise radiation patterns emitted by node 144. More generally, coverage area 168 may comprise a geographical area surrounding node 144. Entities within range of the geographical area associated with coverage area 168 may communicate with node 144. Furthermore, entities outside the range of the geographical area may still communicate with node 144, so long as a communication path exists between node 144 and the entity. For instance, as depicted in FIG. 1, coverage area 168 of node 144 encompasses nodes 142, 148, and 146. As such, node 144 may communicate with each of these devices. Additionally, although coverage area 168 of node 144 does not encompass client device 164, the coverage area (not depicted) of node 146 does encompass that client device. As such, node 144 and client device 164 may communicate via a communication path traversing node 146. Node 144 may also communicate with controller 140 via a communication path traversing node 142, 148, and/or 146.

Further, each of the nodes 142, 144, 146, and 148 may define more than one coverage area. For instance, node 144 may comprise a backhaul radio for communicating with other nodes and/or a controller, and a client radio for communicating with client devices. The backhaul radio and client radio of node 144 may each define their own coverage area (not individually depicted), and the coverage areas may vary in size and shape.

Similarly, mesh network 138 also defines a coverage area 166, which may comprise radiation patterns cooperatively emitted by controller 140, and each of the nodes 142, 144, 146, and 148. Entities within range of the geographical area associated with coverage area 166 are necessarily within the coverage area of at least one of controller 140 and nodes 142, 144, 146, and 148. If an entity comes within range of the coverage area of at least one of controller 140 and nodes 142, 144, 146, and 148, then the entity may form a communication path, and thus communicate with, the other entities associated with mesh network 138 (i.e., controller 140, each of the nodes 142, 144, 146, and 148, and the client device 164).

It should be understood, of course, that this and other arrangements described herein are provided for purposes of example only. As such, those skilled in the art will appreciate that other arrangements and other elements (e.g. nodes, controllers, client devices, external networks, machines, interfaces, communication links, functions, orders of functions, etc.) can be used instead, and some elements may be omitted altogether. For instance, in FIG. 1, the controllers 104 and 140 are each depicted as separate units connected through wireless and wired links to the nodes of their respective networks. However, at least one of controller 104 and controller 140 may include a wireless access point (i.e., a mesh-network node), as well. Further, many of the elements described herein are functional entities that may be implemented as discrete or distributed components, in conjunction with other components, as hardware, firmware and/or software, and in any suitable combination and location.

Figure 2A:
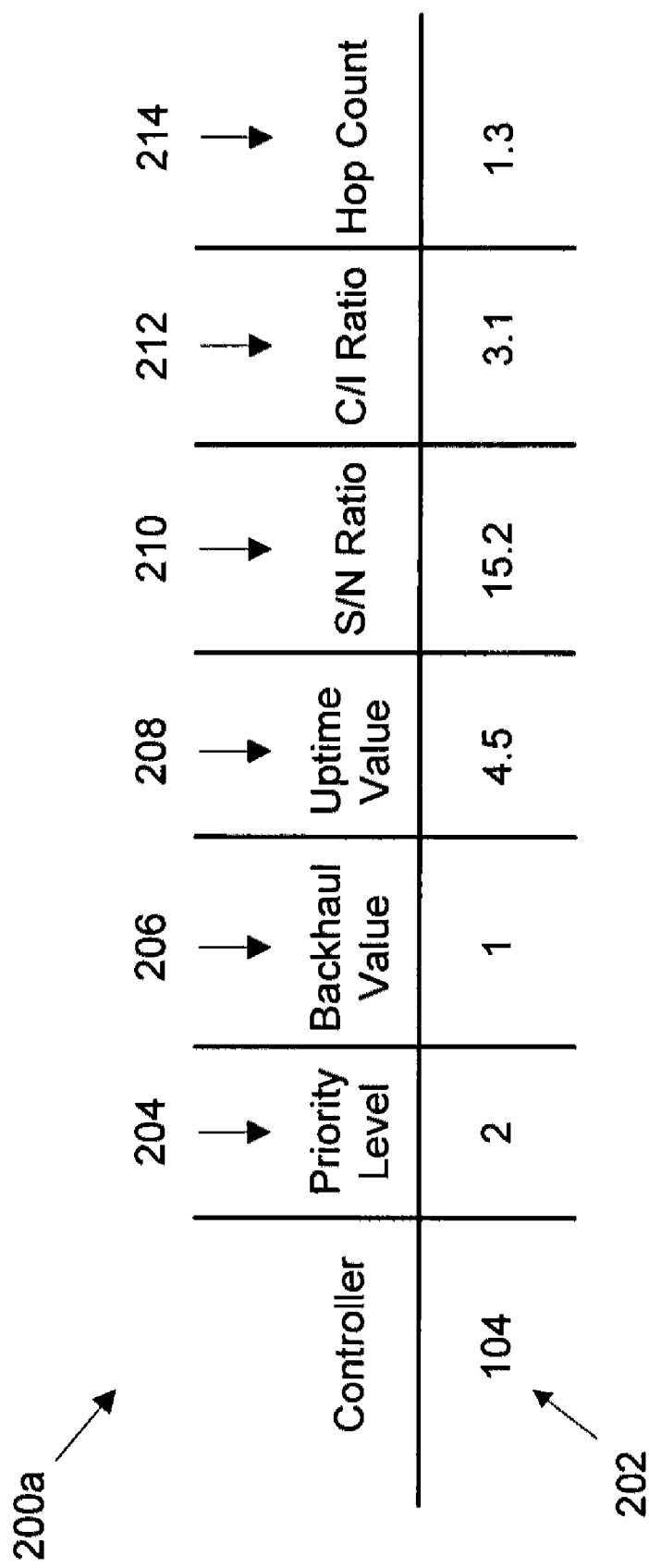
FIGS. 2a, 2b, 2c, and 2d are illustrations of attribute tables for use in carrying out an embodiment of the invention.

Each of the entities of mesh network 102 may be arranged to store various types of data. For instance, controller 104 may include an attribute, which may provide an indication of the priority of controller 104, and may include one or more parameters. Further, the one or more parameters that compose the attribute of controller 104 may dynamically change over time. FIG. 2a is an illustration of a table 200a that, in a row 202, includes an exemplary attribute of controller 104. In this case, the attribute of controller 104 includes several parameters. For instance, column 204 indicates a priority level for controller 104, column 206 indicates a backhaul value, column 208 indicates an uptime value, column 210 indicates a signal-to-noise ratio, column 212 indicates a carrier-to-co-channel interference ratio, and column 214 indicates a hop count for controller 104.

The priority level 204 may be an assigned numerical value pertaining to a priority for controller 104. The priority level may be preconfigured at controller 104, and may also be updated dynamically over time. The backhaul value 206 may be a Boolean value indicating whether or not the controller 104 has a backhaul connection to a packet-switched network, for instance. The uptime value 208 may indicate the length of time (which may be measured in days and/or hours) the controller 104 has been continuously operating. In some instances, a lower uptime value may be more preferable. The signal-to-noise ratio 210 and the carrier-to-cochannel interference ratio 212 may each indicate the quality of transmissions on the mesh network 102. Further, the hop count 214 may indicate the average number of nodes a message must traverse before reaching controller 104, for instance. Other examples and combinations of parameters are also possible.

Each of the nodes 106, 108, 110, and 112 may store various types of data as well. For instance, each of the nodes may store configuration data (e.g., the IP address and/or controller ID of controller 104), and each of the nodes may utilize the configuration data to operate on the mesh network 102.

In addition to storing data, each of the entities of mesh network 102 may be arranged to communicate with one another. Furthermore, each of the nodes 106, 108, 110, and 112 may be arranged to communicate with, and thus serve, one or more client devices (e.g., laptop computers or Wi-Fi phones). Client devices 128 and 132, which are served by nodes 110 and 106 respectively, may also communicate with one another, and the communications may traverse any available path between the two client devices. For example, client device 128 may transmit a signal to client device 132 via a communication path traversing nodes 110, 108, and 106.

In addition to enabling client-device communications, each of the nodes 106, 108, 110, and 112 may regularly (or sporadically) emit Wi-Fi signals (e.g., Wi-Fi beacons or pilot signals). A Wi-Fi signal emitted by node 108, for example, may include the attribute of controller 104. The Wi-Fi signal emitted by node 108 may also include the configuration data of controller 104 (e.g., the controller's IP address, controller ID, and perhaps other information). If a given node is not associated with a controller, for example, then the given node may broadcast a discovery message in an effort to find or associate with another network. The discovery message may provide the other nodes within the given node's coverage area with pertinent information, such as the node's MAC address.

In addition to emitting Wi-Fi signals, each of the nodes 106, 108, 110, and 112 may detect Wi-Fi signals not only from one another, but also from other nodes (or other devices, more generally) that are not currently members of mesh network 102 but that are still within the respective node's coverage area. A Wi-Fi signal that is (a) emitted from a node that is not currently a member of mesh network 102 and (b) detected by node 108, for instance, may be emitted in at least two different ways: (i) the signal may be emitted by a node that is a member of some other mesh network (e.g., mesh network 138) or (ii) the signal may be emitted by a node that is not currently a member of another mesh network. If the signal is emitted from a node that is not currently associated with a controller, then the signal may comprise a discovery message seeking to discover a network with which to associate and/or join.

Furthermore, each of the nodes 106, 108, 110, and 112 may report to controller 104 all (or some) of the Wi-Fi signals that the respective nodes detect, including discovery messages. For instance, each of the nodes 106, 108, 110, and 112 may scan the airwaves and, upon detecting a Wi-Fi signal emitted from another node, send to controller 104 a message that indicates information relating to the other node and controller with which the node is associated. The message may contain various types of information, such as the attribute of the controller the node is associated with, and perhaps the configuration data of the controller.

Additionally, the message sent, for instance, from node 108 to controller 104 may take various forms. The message may take the form of the received Wi-Fi signal itself, in which case the message is a simple pass-through of the Wi-Fi signal. Alternatively, the message may encapsulate the Wi-Fi signal with other data, such as a header. Additionally, the message may be altogether different from the Wi-Fi signal.

Through this process, controller 104 may thus learn of Wi-Fi signals emitted from nodes that are already members of mesh network 102, and Wi-Fi signals emitted by nodes that are not currently members of the mesh network 102. Furthermore, upon receiving a message that indicates information about a node or controller (e.g., the attribute of the other controller) not associated with mesh network 102, controller 104 may then record information about the other node or controller for subsequent evaluation.

For instance, after recording information about the other node or controller, controller 104 may compare its attribute with the attribute of the other controller. As a result of comparing the attribute of controller 104 with the attribute of controller 140, for instance, controller 104 may make a determination that it has a lower priority than controller 140. Of course, controller 104 may alternatively make a determination that it has a higher priority than controller 140. For example, as depicted in table 200b of FIG. 2b, if the attribute of controller 104 is a priority level 220, and the attribute of controller 140 is a priority level 222, then controller 104 would compare the priority level 220 with the priority level 222. Since the priority level 220 is lower than the priority level 222, controller 104 will determine that it has a lower priority than controller 140. As another example, as depicted in table 200c of FIG. 2c, if the attribute of controller 104 is an uptime value 230, and the attribute of controller 140 is an uptime value 232, then controller 104 may compare the uptime value 230 with the uptime value 232. If a lower uptime value is more preferable, controller 104 will determine that it has a lower priority than controller 140 since the uptime value 230 is greater than the uptime value 232.

Figure 2B:
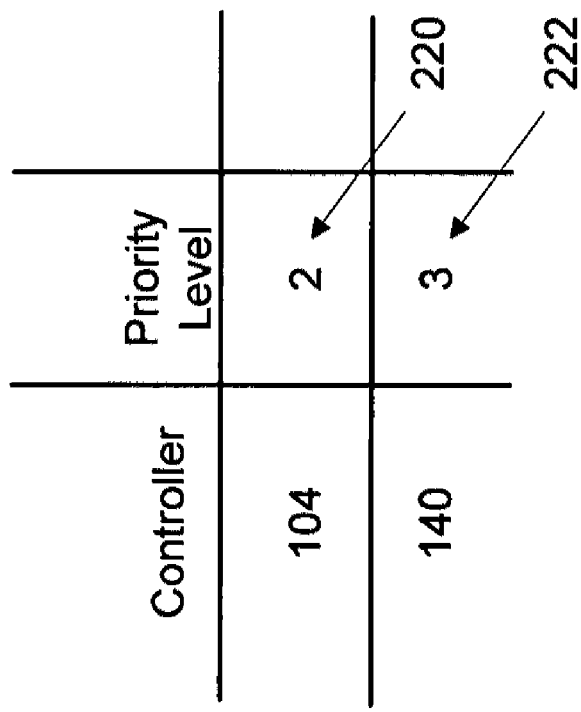
Figure 2C:
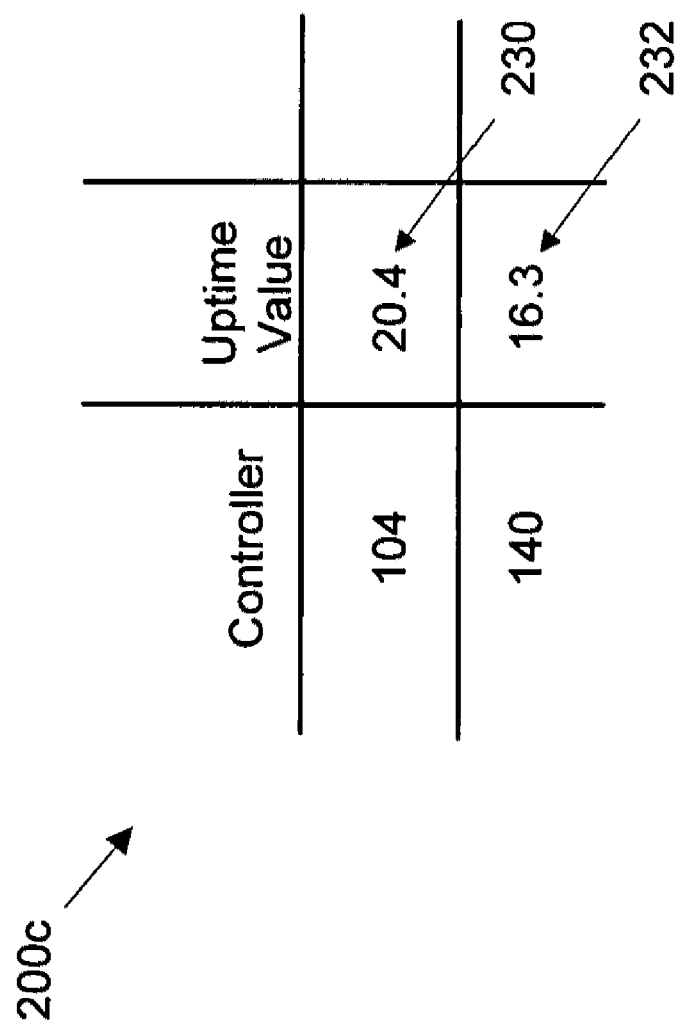
Figure 2D:
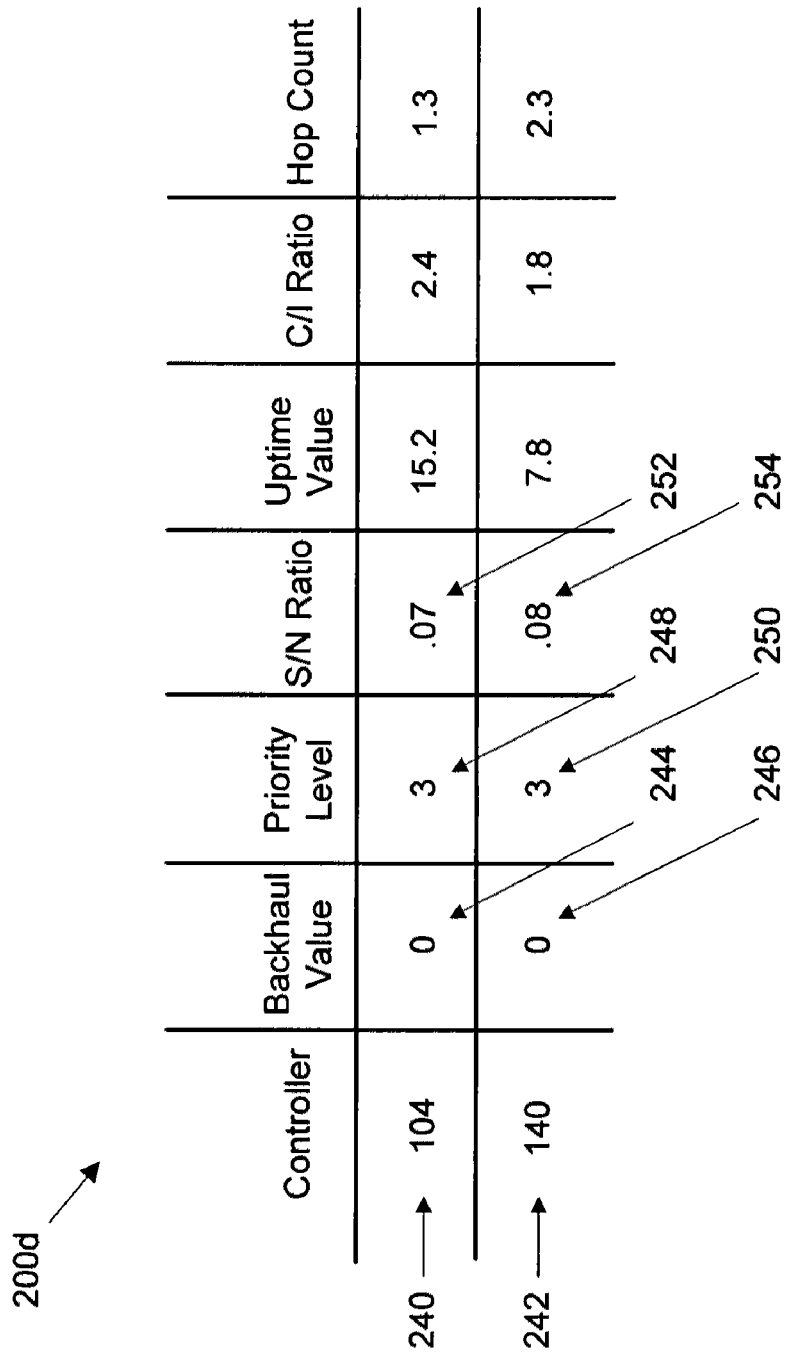

If, as depicted in table 200d of FIG. 2d, the attribute of controller 104 includes a plurality of parameters 240, and the attribute of controller 140 also includes a plurality of parameters 242, then controller 104 may sequentially compare parameters from the plurality 240 with corresponding parameters from the plurality 242 until identifying a difference between a parameter from the plurality 240 and a corresponding parameter from the plurality 242. For instance, controller 104 may first compare its backhaul value 244 with the backhaul value 246 of controller 140. Since the backhaul value 244 and the backhaul value 246 are equal, controller 104 may then compare its priority level 248 with the priority level 250 of controller 140. Again, since the priority level 248 is equal to the priority level 250, controller 104 may then compare its signal-to-noise ratio 252 with the signal-to-noise ratio 254 of controller 140. In this case, the signal-to-noise ratio 252 of controller 104 is less than the signal-to-noise ratio 254 of controller 140. Hence, controller 104 may determine that it has a lower priority than controller 140. Of course, the sequence in which various corresponding parameters are compared may be varied.

In addition to comparing its attribute with the attribute of another controller, controller 104 may determine whether or not to authorize another node to join mesh network 102. Making the decision to authorize a node not currently associated with mesh network 102 may comprise, for example, determining whether the other node is trusted (or friendly or known), and should thus be allowed to operate on mesh network 102, or whether the other node is unknown (or not trusted), and thus should not be allowed to operate on mesh network 102. To evaluate whether the other node is trusted, controller 104 may refer to peering data. Specifically, after receiving a message that includes information about another node not currently associated with mesh network 102, and after recording such information, controller 104 may then determine whether the peering data includes the information relating to the node.

Generally, if controller 104 determines that the other node is trusted, it may then send a response back to node 108, which received the discovery message, for instance, authorizing node 108 to associate with the other node and to make the other node a member of the mesh network 102. The other node would then communicate using one or more parameters of the mesh network 102, would become controlled by controller 104, and would exchange routing and networking information (e.g., ARP tables and TCP/IP communications) with node 108. On the other hand, if controller 104 determines that the other node is unknown or not trusted, or belongs to a controller that is unknown or not trusted, controller 104 may ignore the message about the other node or direct node 108 to disregard the received discovery message.

Likewise, controller 140 and each of the nodes 142, 144, 146, and 148 of mesh network 138 may operate in a similar manner as controller 104 and each of the nodes 106, 108, 110, and 112 of mesh network 102, respectively.

FIG. 3 depicts a scenario 300 where node 108 of mesh network 102 and node 144 of mesh network 138 each detect the other's emitted Wi-Fi signals. In this scenario, it may be desirable for the controller with the higher priority to take over the nodes of the other network. In this example, controller 140 has a higher priority, so it will take over at least one node in the first group (i.e., at least one of node 106, 108, 110, and 112).

The following describes methods and systems for controller 140 of the mesh network 138 to take over at least one node in the first group. Further, the following also describes embodiments of entities that may be used to carry out such a function. Looking ahead to FIG. 7, once controller 140 takes over the nodes of the first group, each of the nodes 106, 108, 110, and 112 may each become associated with controller 140 via the respective communication links 704, 702, 708, and 706, and thus join mesh network 138. In addition, client device 128, which was initially associated with controller 104, will become associated with controller 140. Furthermore, if node 142 of mesh network 138 is in communication with a network 712, such as a packet-switched network, via a wireless communication link 710, then client device 128, for instance, may communicate over the network 712.

III. Exemplary Controller

Figure 4:
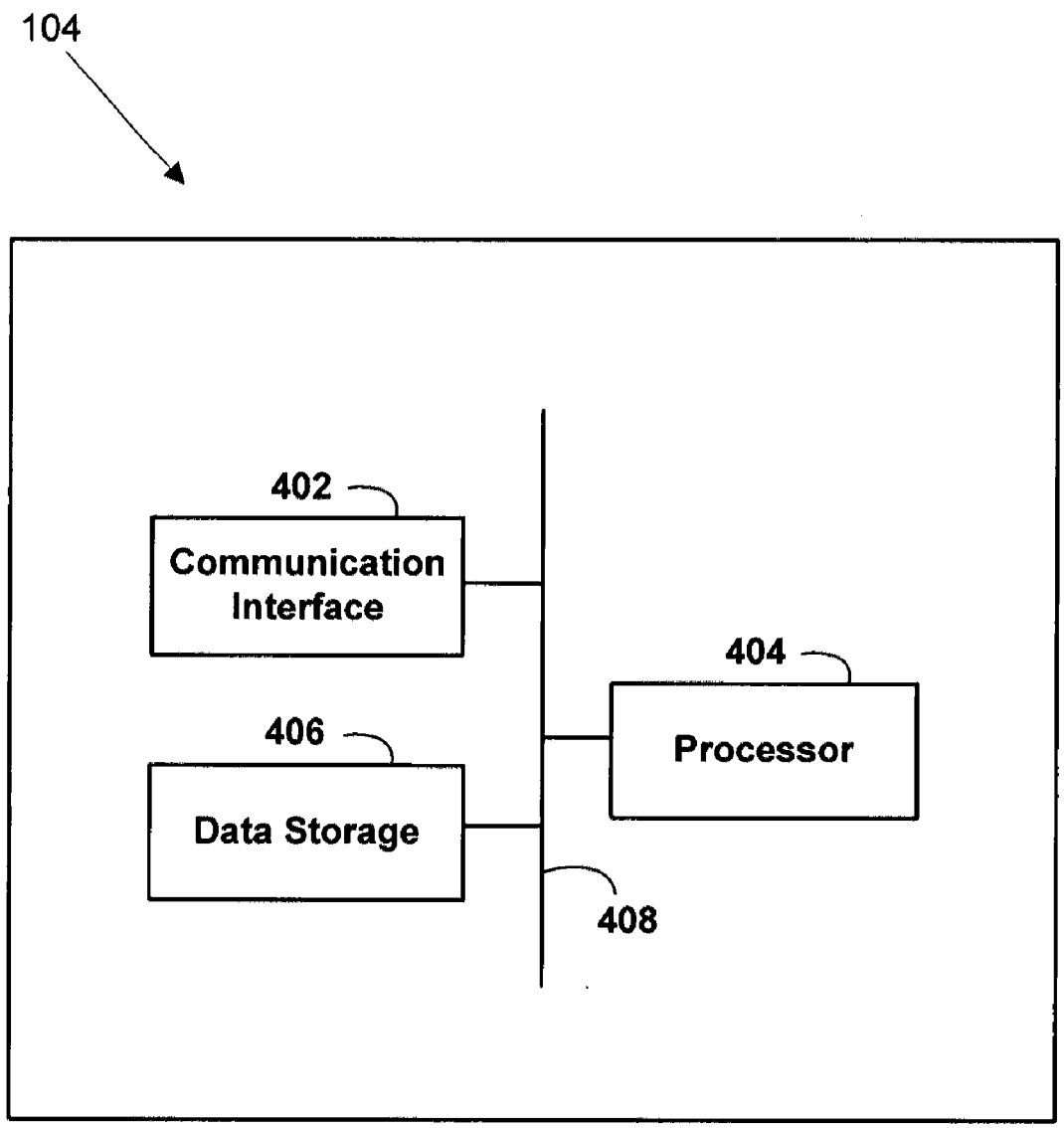
FIG. 4 is a block diagram of a controller for use in carrying out an embodiment of the invention.

FIG. 4 is a block diagram of controller 104 for use in carrying out an embodiment of the present invention. As depicted in FIG. 4, controller 104 includes a communication interface 402, a processor 404, and data storage 406, all linked together via a system bus, network, or other connection mechanism 408. Further, controller 140 may be arranged in a similar manner.

The communication interface 402 provides an interface between controller 104 and other entities. For instance, the communication interface 402 may enable communications with the first group of nodes. Further, the communication interface 402 may be operable to receive a message from a given node in the first group, the message indicating that the given node in the first group received a signal from a node not currently associated with controller 104. Additionally, the communication interface 402 may enable communications with other network entities that are not shown in FIGS. 1, 3, 6, and 7.

The processor 404 may comprise one or more processors (e.g., one or more general-purpose processors and/or one or more specialized (e.g., dedicated) processors). The processor 404 is arranged to carry out functions described herein, and may do so by executing computer-readable program instructions stored in data storage 406 and/or in firmware. In response to executing the program instructions, the processor 404 may interact with the communication interface 402, and/or the connection mechanism 408 so as to carry out functions described herein.

The data storage 406 may comprise a computer-readable medium, and may also comprise volatile and/or non-volatile storage components, such as optical, magnetic, organic, flash, and/or other memory or disc storage. The computer-readable medium of data storage 406 may be integrated in whole or in part with the processor 404.

Data storable on data storage 406 may be arranged as program instructions executable by the processor 404. Data storage 406 may store various types of reference data as well. For example, the data may include an attribute of controller 104, configuration data, peering data, and other data as well.

IV. Exemplary Node

Figure 5:
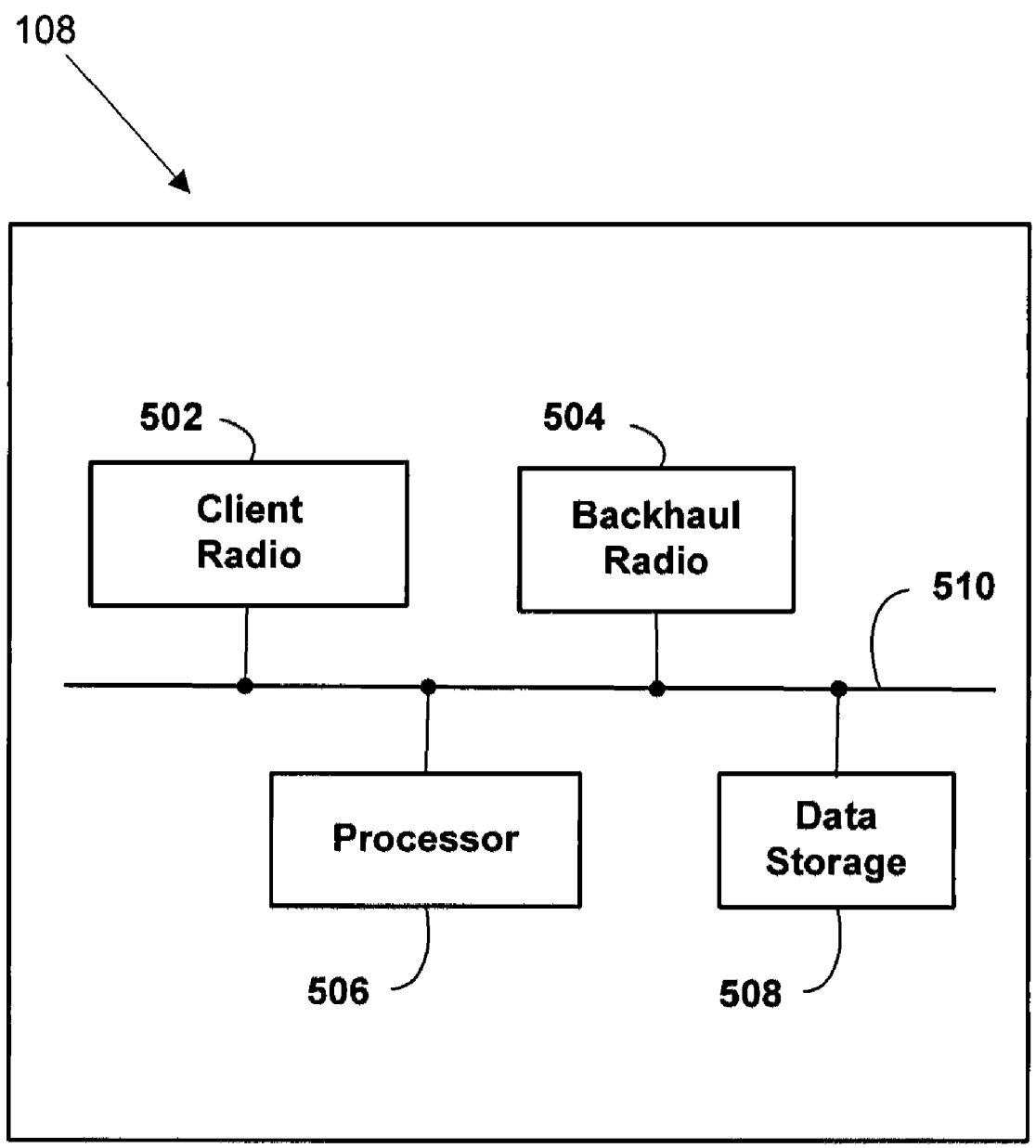
FIG. 5 is a block diagram of a mesh-network node for use in carrying out an embodiment of the invention.

FIG. 5 is a block diagram of node 108 for use in carrying out an embodiment of the present invention. As depicted in FIG. 5, node 108 includes a client radio 502, a backhaul radio 504, a processor 506, data storage 508, all linked together via a system bus, network, or other connection mechanism 510. Further, each of the other nodes in the first and second groups may be arranged in a similar manner.

The client radio 502 may provide an interface between (i) one or more client devices (or devices, more generally) served by node 108 and (ii) other elements of node 108. Further, the client radio 502 may be communicatively coupled to the backhaul radio 504, so that communications may pass between the two radios. Also, the client radio 502 may enable communications with other network entities not necessarily depicted in FIG. 1, 3, 6, or 7.

The backhaul radio 504 provides means for node 108 to engage in backhaul communications with controller 104, entities associated with controller 104, entities associated with a different controller or mesh network, and entities that are not associated with a controller or mesh network. The backhaul radio 504 may also be communicatively coupled to the client radio 502 to allow communications to pass between the two radios. Additionally, the backhaul radio 504 may be operable to receive communications from controller 104. Also, the backhaul radio 504 may enable communications with other network entities not necessarily depicted in FIG. 1, 3, 6, or 7. Although depicted separately, the client radio 502 and the backhaul radio 504 may be embodied in a single communications interface.

The processor 506 may comprise one or more processors (e.g., one or more general-purpose processors and/or one or more specialized (e.g., dedicated) processors). The processor 506 is arranged to carry out functions described herein, and may do so by executing computer-readable program instructions stored in data storage 508 and/or in firmware. In response to executing the program instructions, the processor 506 may interact with the client radio 502, the backhaul radio 504, and/or connection mechanism 510 so as to carry out functions described herein.

The data storage 508 may comprise a computer-readable medium, and may also comprise volatile and/or non-volatile storage components, such as optical, magnetic, organic, flash, and/or other memory or disc storage. The computer-readable medium of data storage 508 may be integrated in whole or in part with the processor 506.

Data storable on data storage 508 may be arranged as program instructions executable by the processor 506. Data storage 508 may store various types of reference data as well. For example, the data may include configuration data, which enables the node 108 to operate on a corresponding mesh network (e.g., either mesh network 102 or another mesh network). Other examples of reference data stored on the data storage 508 are possible.

V. Exemplary Operation of an Embodiment

In one embodiment, node 108 of mesh network 102 detects the presence of mesh network 138 by receiving a Wi-Fi signal emitted from node 144, and node 144 likewise detects the presence of mesh network 102 by receiving a Wi-Fi signal emitted from node 108. The Wi-Fi signal emitted by node 144 will include the attribute of controller 140. Controller 104 may then receive a message from node 108, the message indicating that node 108 received a Wi-Fi signal from node 144. Further, the message will include the attribute of controller 140. Responsive to receiving the message from node 108, controller 104 may then compare the attribute of controller 104 with the attribute of controller 140. As a result of comparing the attribute of controller 104 with the attribute of controller 140, controller 104 may make a determination that it has a lower priority than controller 140. Responsive to making the determination that controller 104 has a lower priority than controller 140, controller 104 may no longer communicate with the first group, resulting in at least node 108 joining the mesh network 138.

Figure 6:
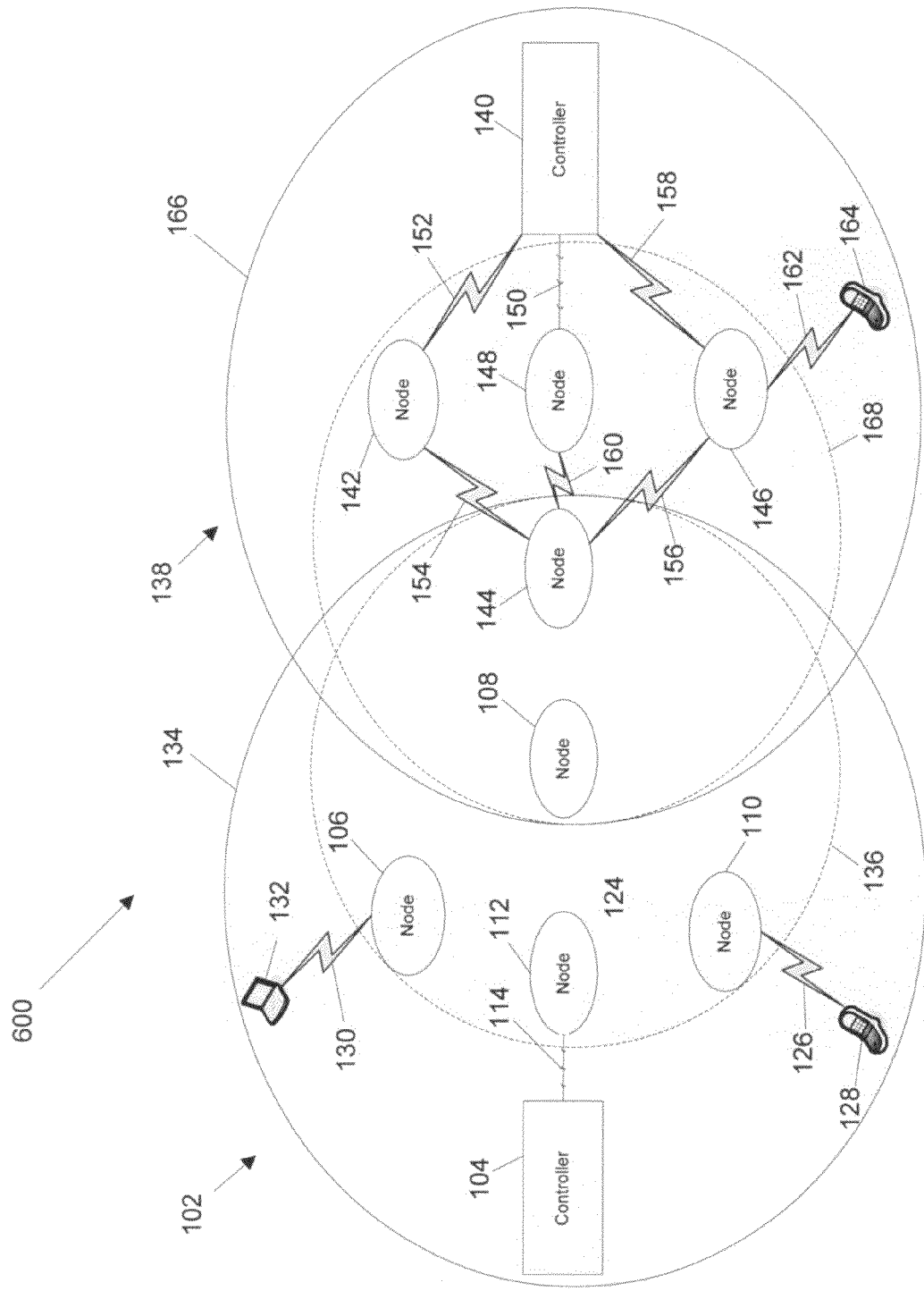
FIG. 6 is a block diagram depicting a network arrangement in which an embodiment of the invention can be implemented.

FIG. 6 depicts a scenario 600 where controller 104 no longer communicates with the first group of nodes (i.e., each of the nodes 106, 108, 110, and 112). According to FIG. 6, each of the communication links 114, 116, 118, 120, 122, and 124 from FIG. 1 may be disabled. Alternatively, only communications links 116 and 122 may each be disabled, while the rest remain active. Further, the communication links 126 and 130, which couple node 110 to client device 128 and node 106 to client device 132, respectively, may each still remain active.

Figure 7:
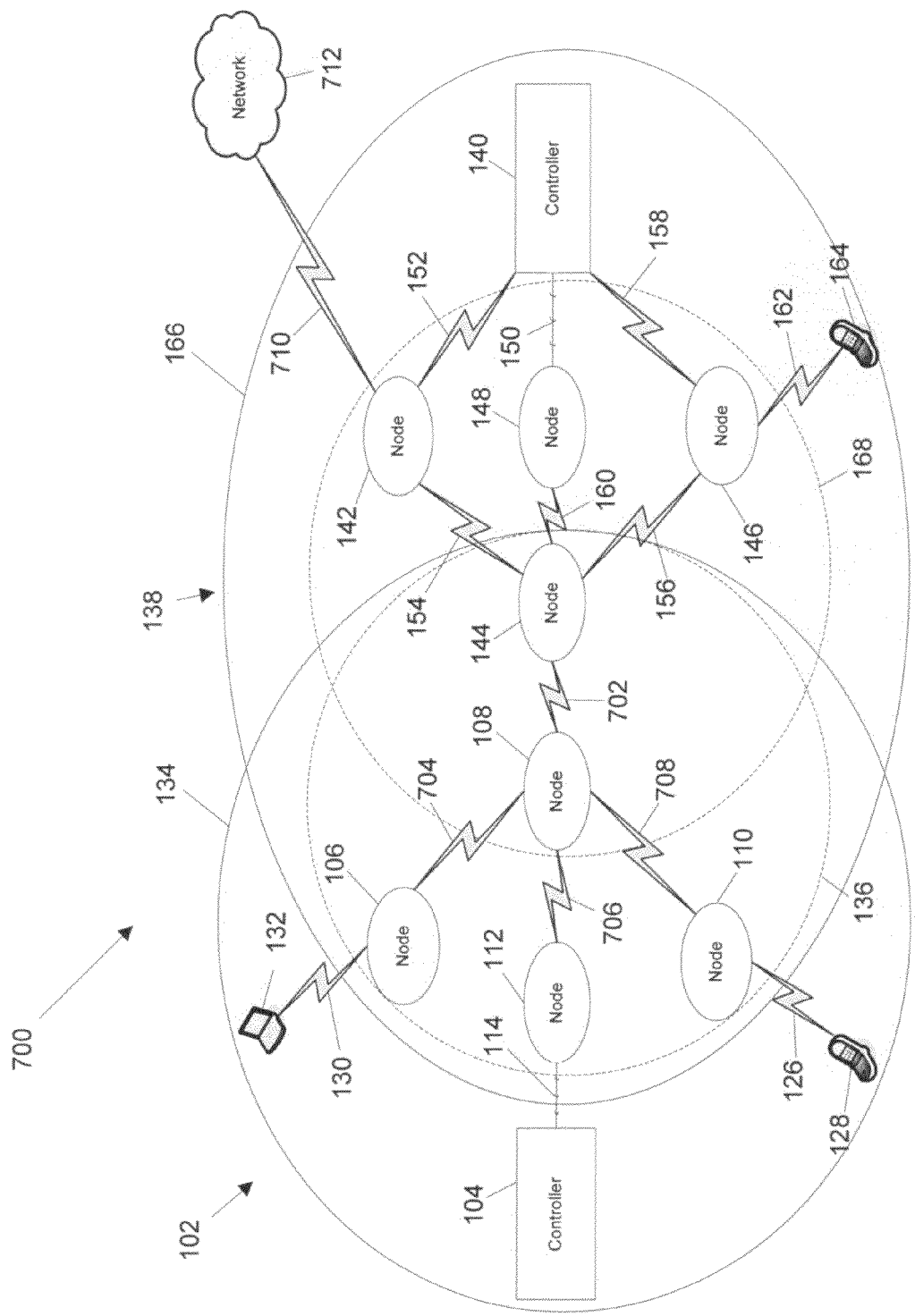
FIG. 7 is a block diagram depicting a network arrangement in which an embodiment of the invention can be implemented.

Without a controller to associate with, the node 108 may then broadcast a discovery message, which may be detected by node 144. The node 144 may then pass a message to controller 140, the message including the discovery message of the node 108. Responsive to receiving the message, controller 140 may then authorize the node 108 to join the mesh network 138. As depicted in FIG. 7, the node 108 may thus eventually become communicatively coupled to the mesh network 138 via a communication link 702.

Each of the nodes 106, 110, and 112 may also broadcast respective discovery messages that are each detected by node 108, for instance. Node 108 may pass each of the messages to controller 140, each message including a respective discovery message from each of the nodes 106, 110, and 112. Controller 140 may then authorize each of the nodes 106, 110, and 112 to join mesh network 138. The nodes 106, 110, and 112 may then also become communicatively coupled to the mesh network 138 via the communication links 704, 708, and 706.

FIG. 8 is a flow chart 800 provided to illustrate some of the functions that may be carried out in accordance with an embodiment of the present invention. The illustrated functions are explained in the following subsections.

A. Node from Each Network Receives the Other's Emitted Signal

As depicted in FIG. 8, at block 802, node 108 receives a Wi-Fi signal emitted from node 144, and node 144 likewise receives a Wi-Fi signal emitted from node 108. This scenario may occur through movement of the nodes, or if node 108 is off-line, for example, and powered-on in a location that is within the coverage area of node 144. Further, the Wi-Fi signal emitted by node 144 will include the attribute of controller 140, and the Wi-Fi signal emitted by node 108 will include the attribute of controller 104.

B. The First Controller Receives a First Message from a Node in the First Group

At block 804a, controller 104 receives a first message from node 108. Upon node 108 detecting the Wi-Fi signal (first signal) emitted by node 144, node 108 may send the first message to controller 104. The first message may comprise the first signal, or may be altogether different from the first signal. Further, the first message will preferably include the attribute of controller 140. Upon receiving the first message, controller 104 may record the attribute of controller 140.

C. The First Controller Compares Controller Attributes

At block 806a, responsive to receiving the first message, controller 104 compares the attribute of controller 104 with the attribute of controller 140. If the attribute of controller 104 and the attribute of controller 140 each include a single numerical value, controller 104 may simply compare the numerical value representing the attribute of controller 104 with the numerical value representing the attribute of controller 140. On the other hand, if the attribute of controller 104 includes a first plurality of parameters, and the attribute of controller 140 includes a second plurality of parameters, then controller 104 may sequentially compare parameters from the first plurality with corresponding parameters from the second plurality until identifying a difference between a parameter from the first plurality and a corresponding parameter from the second plurality. Other possibilities exist as well.

D. As a Result of Comparing the First Attribute with the Second Attribute, the First Controller Makes a Determination that the First Controller has a Lower Priority than the Second Controller At block 808a, as a result of comparing the attribute of controller 104 with the attribute of controller 140, controller 104 makes a determination that controller 104 has a lower priority than controller 140. As depicted in FIG. 2b, controller 104 may determine that it has a lower priority than controller 140 by determining that priority level 220 is less than priority level 222. On the other hand, as depicted in FIG. 2c, controller 104 may determine that it has a lower priority than controller 140 by determining that uptime value 230 is greater than uptime value 232 (if a lower uptime value is more preferable).

As depicted in FIG. 2d, in the case where the attribute of controller 104 includes a plurality of parameters 240 and the attribute of controller 140 includes a plurality of parameters 242, controller 104 may determine that it has a lower priority than controller 140 by determining that the signal-to-noise ratio 252 is less than the signal-to-noise ratio 254. Controller 104 may make the determination that the signal-to-noise ratio 252 is less than the signal-to-noise ratio 254 after firstly determining that the backhaul value 248 and the backhaul value 250 are equal, and after secondly determining that the priority level 248 and the priority level 250 are also equal.

E. Responsive to Making the Determination, the First Controller No Longer Communicates with the First Group At block 810, responsive to making the determination it has a lower priority than controller 140, controller 104 no longer communicates with the first group of nodes (i.e., each of the nodes 106, 108, 110, and 112), resulting in at least one node in the first group joining mesh network 138. For instance, controller 104 may no longer communicate with the first group by not responding to communications received from the first group of nodes. In addition to no longer communicating with the first group of nodes, controller 104 may also power down.

F. At Least One Node from the First Group Joins the Second Network

At block 812, at least one node from the first group joins the second network. When controller 104 no longer communicates with the first group of nodes, each of the nodes in the first group may consider themselves no longer associated with a controller, and each node in the first group may responsively broadcast a respective discovery message. For instance, node 108 may broadcast a discovery message that is detected by node 144. Node 144 may then pass a message to controller 140, that message including the discovery message. Responsive to receiving the message, controller 140 may then authorize node 108 to join mesh network 138.

As depicted in FIG. 7, the node 108 may become communicatively coupled to the mesh network 138 via the communication link 702. Each of the nodes 106, 110, and 112 may also broadcast respective discovery messages that are each detected by node 108, for instance (or by the other nodes as they join the second network). Node 108 may pass each of the messages to controller 140, those messages including the respective discovery messages from each of the nodes 106, 110, and 112. Controller 140 may then authorize each of the nodes 106, 110, and 112 to join mesh network 138. The nodes 106, 110, and 112 may then become communicatively coupled to the mesh network 138 via the communication links 704, 708, and 706, respectively. Hence, all of the nodes in the first group may join mesh network 138. Although node 112 is depicted to be communicatively coupled to controller 104 via the wired communication link 114, node 112 may still join mesh network 138. Alternatively, rather than node 112 joining mesh network 112, node 112 may remain associated with mesh network 102.

G. The Second Controller Receives a Second Message from a Node in the Second Group At block 804b, which may occur at approximately the same time controller 104 receives the first message, controller 140 receives a second message from node 144. Upon node 144 detecting a Wi-Fi signal (second signal) emitted by node 108, node 144 may send the second message to controller 140. The second message may comprise the second signal, or may be altogether different from the second signal. Additionally, the second message may include the attribute of controller 104. Upon receiving the second message, controller 140 may record the attribute of controller 104.

H. The Second Controller Compares Controller Attributes

At block 806b, responsive to receiving the second message, controller 140 compares the attribute of controller 140 with the attribute of controller 104. Controller 140 may compare the attribute of controller 140 with the attribute of controller 104 in a manner similar to that described above with respect to controller 104.

I. As a Result of Comparing the Second Attribute with the First Attribute, the Second Controller Makes a Determination that the Second Controller has a Higher Priority than the First Controller At block 808b, as a result of comparing the attribute of controller 140 with the attribute of controller 104, controller 140 will make a determination that it has a higher priority than controller 104. Controller 140 may make the determination that it has a higher priority than controller 104 in a manner similar to that described above with respect to controller 104.

Hence, controller 104 and 140 will each make the same determination as to which controller has the higher priority, because they will each apply the same logic for selecting the controller with the higher priority based on a comparison of each controller's respective attribute. Therefore, both controllers will agree that, in this scenario, controller 140 has a higher priority than controller 104, and will thus take over at least one node in the first group.

Once node 108, for instance, joins mesh network 138, it may operate on mesh network 138 just like each of the other nodes in the second group. However, the process of a mesh-network takeover may be dynamic. As such, controller 104 may again communicate with the nodes in the first group, and either or both of the attributes of controller 104 or controller 140 may change, possibly causing controller 104 to then have a higher priority than controller 140. For instance, the priority level of controller 104 may be increased, or a backhaul connection to the Internet may be established (thus increasing the backhaul value of controller 104).

In operation, after joining mesh network 138, node 108 may receive communications from controller 104. Controller 140 may receive a message from node 108, the message indicating that node 108 received communications from controller 104. Further the message will preferably include the attribute of controller 104. Similar to the process described above, responsive to receiving that message, controller 140 will then compare the attribute of controller 140 with the attribute of controller 104. Responsive to comparing the attribute of controller 140 with the attribute of controller 104, controller 140 will make a determination that it now has a lower priority than controller 104. Responsive to making that determination, controller 140 may no longer communicate with either the second group or the first group, resulting in at least one of (a) at least one node in the first group rejoining the mesh network 102 and (b) at least one node in the second group joining the mesh network 102.

VI. Exemplary Operation of a Second Embodiment

In a second embodiment, rather than controller 104 no longer communicating with the first group of nodes after determining that it has a lower priority than controller 140, controller 104 may direct node 108, for instance, to disassociate from mesh network 102. Further, controller 104 may also direct node 108 to join mesh network 138.

Figure 9A:
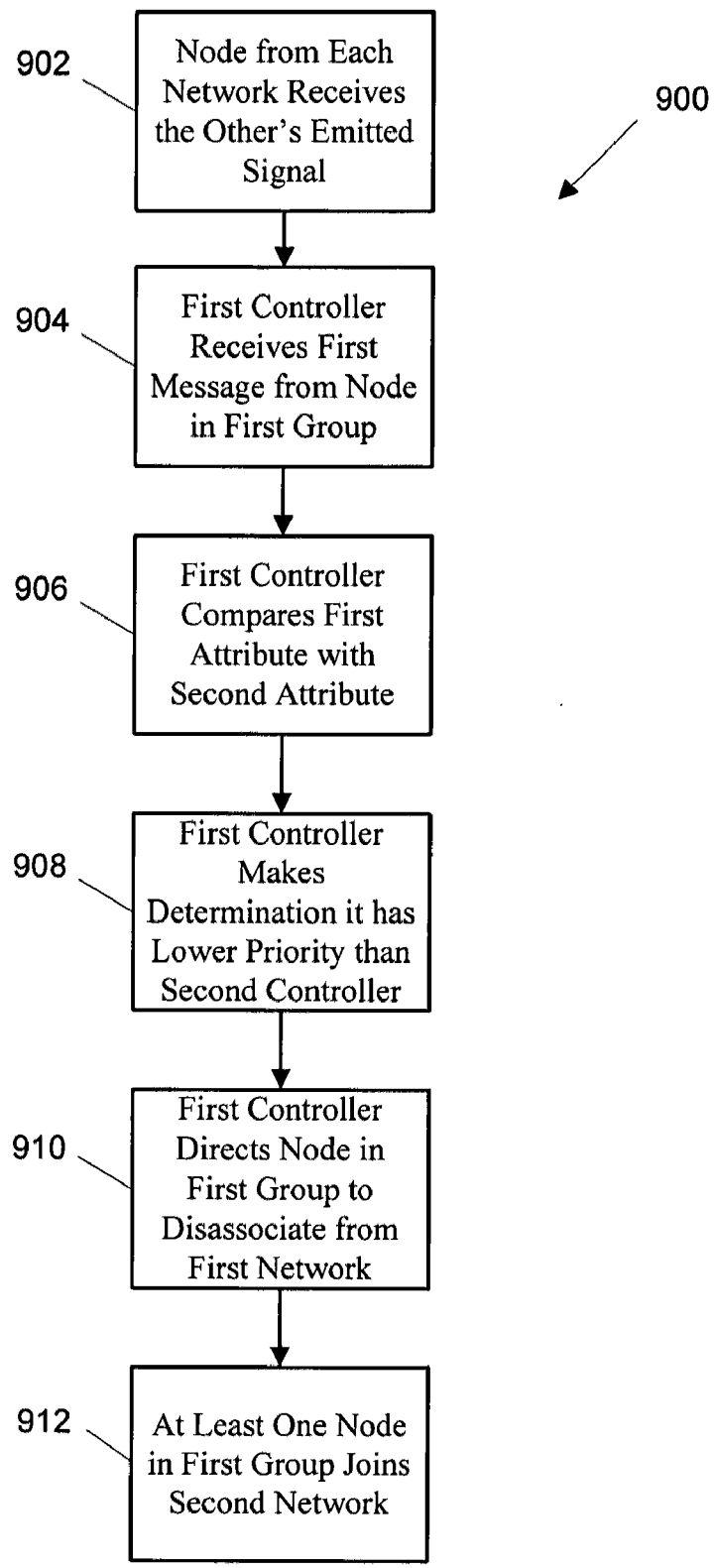
FIGS. 9a and 9b are flow charts provided to illustrate some of the functions that may be carried out in accordance with an embodiment of the invention.
Figure 9B:
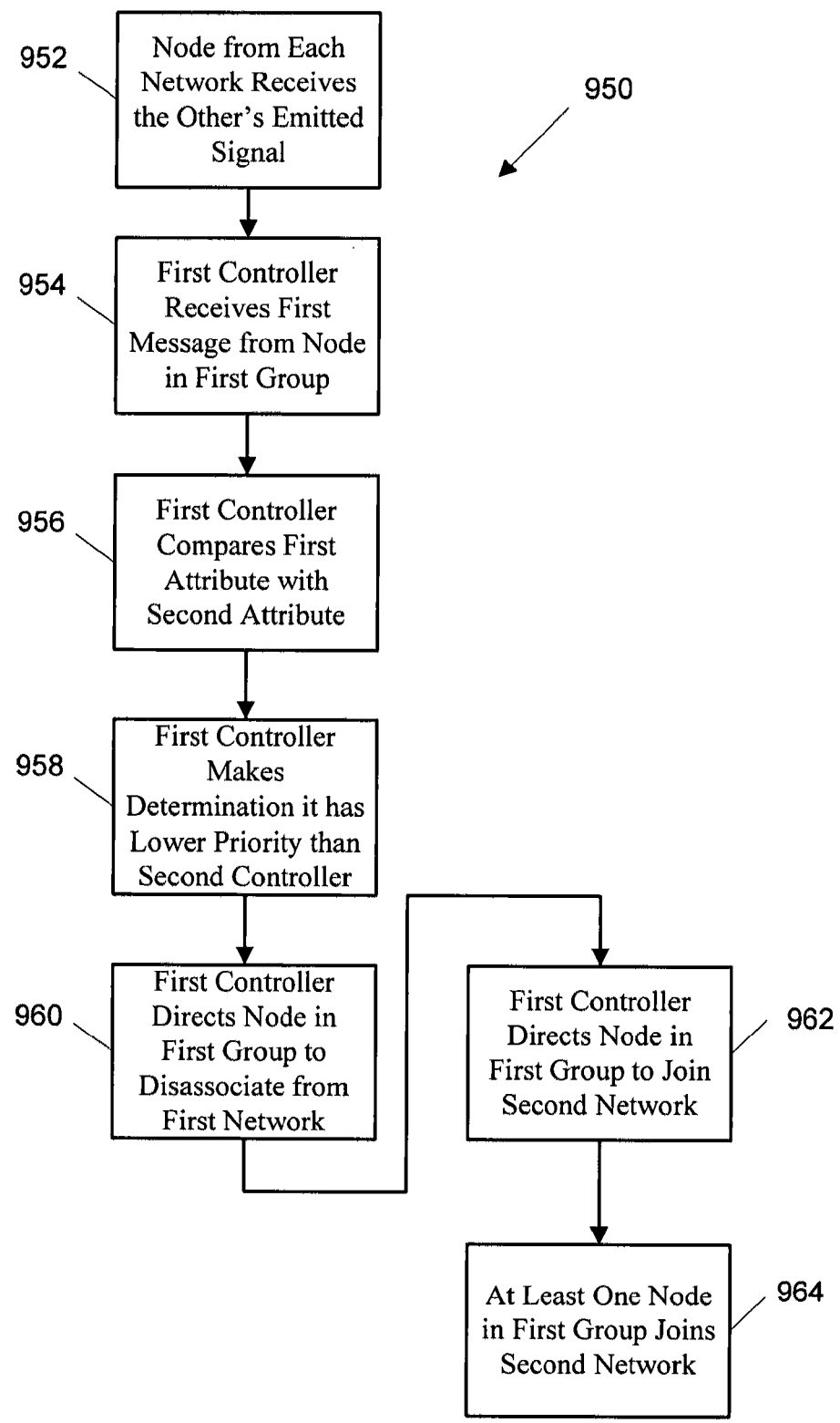

FIGS. 9a and 9b are flow charts 900 and 950, respectively, provided to illustrate some of the functions that may be carried out in accordance with this exemplary embodiment of the present invention. The illustrated functions are explained in the following subsections.

A. FIG. 9a: Controller 109 Directs Node 108 to Disassociate from Mesh Network 102

1. Node from Each Network Receives the Other's Emitted Signal

According to FIG. 9a, at block 902, node 108 receives a Wi-Fi signal emitted from node 144, and node 144 likewise receives a Wi-Fi signal emitted from node 108. The Wi-Fi signal emitted by node 144 may include the attribute and configuration data of controller 140, and the Wi-Fi signal emitted by node 108 may include the attribute and configuration data of controller 104.

2. The First Controller Receives a First Message from a Node in the First Group

At block 904, controller 104 receives a first message from node 108. Upon node 108 detecting the Wi-Fi signal (first signal) emitted by node 144, node 108 may send the first message to controller 104. The first message may comprise the first signal, or may be altogether different from the first signal. Further, the first message may include the attribute and configuration data of controller 140. Upon receiving the first message, controller 104 may record the attribute and configuration data of controller 140.

3. The First Controller Compares Controller Attributes

At block 906, responsive to receiving the first message, controller 104 compares the attribute of controller 104 with the attribute of controller 140. Controller 104 may compare the attribute of controller 104 with the attribute of controller 140 in a manner similar to that described above with respect to block 806a in FIG. 8.

4. As a Result of Comparing the First Attribute with the Second Attribute, the First Controller Makes a Determination that the First Controller has a Lower Priority than the Second Controller At block 908, as a result of comparing the attribute of controller 104 with the attribute of controller 140, controller 104 will make a determination that it has a lower priority than controller 140. Controller 104 may make the determination that it has a lower priority than controller 140 in a manner similar to that described above with respect to block 808a in FIG. 8.

5. Responsive to Making the Determination, the First Controller Directs at Least One Node in the First Group to Disassociate from the First Network At block 910, responsive to making the determination it has a lower priority than controller 140, controller 104 directs node 108, for instance, to disassociate from mesh network 102. Further, controller 104 may direct each of the nodes in the first group to disassociate from mesh network 102.

6. At Least One Node in the First Group Joins the Second Network

At block 912, upon controller 104 directing node 108 to disassociate from mesh network 102, node 108 may consider itself no longer associated with a controller, and responsively broadcast a discovery message. As described above, node 108 may broadcast a discovery message that is detected by node 144. Node 144 may then pass a message to controller 140, that message including the discovery message. Responsive to receiving the message, controller 140 may then authorize node 108 to join mesh network 138.

Each of the nodes 106, 110, and 112 may also broadcast respective discovery messages that are each detected by node 108, for instance. Node 108 may then pass messages to controller 140, each message including a respective discovery message from each of the nodes 106, 110, and 112. Controller 140 may then authorize each of the nodes 106, 110, and 112 to join mesh network 138. Hence, all of the nodes in the first group may join mesh network 138. Although node 112 is depicted to be communicatively coupled to controller 104 via the wired communication link 114, node 112 may still join mesh network 138. Alternatively, rather than joining mesh network 112, node 112 may remain associated with mesh network 102.

B. FIG. 9b: Controller 109 Also Directs Node 108 to Join Mesh Network 138

1. Node from Each Network Receives the Other's Emitted Signal

Similar to block 902 described above with respect to FIG. 9a, at block 952 of FIG. 9b, node 108 receives a Wi-Fi signal emitted from node 144, and node 144 likewise receives a Wi-Fi signal emitted from node 108.

2. The First Controller Receives a First Message from a Node in the First Group

Like block 904 described above, at block 954, controller 104 receives a first message from node 108. Upon node 108 detecting the Wi-Fi signal (first signal) emitted by node 144, node 108 may send the first message to controller 104. The first message may include the attribute and configuration data of controller 140.

3. The First Controller Compares Controller Attributes

Similar to block 906, at block 956, responsive to receiving the first message, controller 104 compares the attribute of controller 104 with the attribute of controller 140.

4. As a Result of Comparing the First Attribute with the Second Attribute, the First Controller Makes a Determination that the First Controller has a Lower Priority than the Second Controller Like block 908 described above, at block 958, as a result of comparing the attribute of controller 104 with the attribute of controller 140, controller 104 will make a determination that it has a lower priority than controller 140.

5. Responsive to Making the Determination, the First Controller Directs at Least One Node in the First Group to Disassociate from the First Network Similar to block 910, at block 960, responsive to making the determination it has a lower priority than controller 140, controller 104 directs node 108, for instance, to disassociate from mesh network 102. Further, controller 104 may direct each of the nodes in the first group to disassociate from mesh network 102.

6. The Second Controller Directs at Least One Node in the First Group to Join the Second Network Further, at block 962, responsive to making the determination it has a lower priority than controller 140, controller 104 may direct at least one node in the first group to join mesh network 138. For instance, controller 104 may direct node 108 to join mesh network 138 by reconfiguring node 108 to store configuration data corresponding to controller 140 and/or mesh network 138, so as to enable node 108 to operate on mesh network 138. Controller 104 may reconfigure node 108 in a variety of ways. For example, controller 104 may reconfigure node 108 by sending to node 108 configuration data corresponding to controller 140, along with instructions for node 108 to overwrite its stored configuration data corresponding to controller 104 with the configuration data corresponding to controller 140. As an example, controller 104 may reconfigure node 108 to include the IP address and/or the controller ID of controller 140.

7. At Least One Node in the First Group Joins the Second Network

At block 964, upon being reconfigured to store configuration data corresponding to controller 140 and/or mesh network 138, node 108 may join mesh network 138. Further, controller 104 may direct each of the other nodes in the first group (e.g., nodes 106, 110, and 112) to join mesh network 138, and may similarly reconfigure each of the nodes with the appropriate configuration data to enable each of the nodes to become members of mesh network 138.

Upon each of the nodes in the first group joining mesh network 138, client device 128, which was initially associated with controller 104, will become associated with controller 140. Furthermore, if node 142 of mesh network 138 is in communication with the network 712, such as a packet-switched network, via a wireless communication link 710, then client device 128, for instance, may communicate over the network 712.

As noted, once node 108, for instance, joins mesh network 138, it may operate on mesh network 138. However, similar to the previous embodiment described above, the network-takeover scenario may be dynamic. Hence, either the attribute of controller 104 or controller 140 may change, possibly enabling controller 104 to have a higher priority than controller 140.

In operation, after joining mesh network 138, node 108 may receive communications from controller 104. Controller 140 may receive a message from node 108, the message indicating that node 108 received communications from controller 104. Further, the message may include the attribute and configuration data of controller 104. Similar to the process described above, responsive to receiving the message, controller 140 will then compare the attribute of controller 140 with the attribute of controller 104. Responsive to comparing the attribute of controller 140 with the attribute of controller 104, controller 140 will make a determination that it now has a lower priority than controller 104. Responsive to making the determination that it now has a lower priority than controller 104, controller 140 may direct node 108 to disassociate from mesh network 138. Further, controller 140 may direct each of the nodes in the first and second groups to disassociate from mesh network 138. Additionally, controller 140 may direct each of the nodes in the first group to rejoin mesh network 102, and direct each of the nodes in the second group to join mesh network 102.

VII. Conclusion

Exemplary embodiments of a mesh network takeover have been described above. Those skilled in the art will understand, however, that changes and modifications may be made to the embodiments described without departing from the true scope and spirit of the present invention, which is defined by the claims.

We claim:

1. In a communications system wherein a first mesh network ("first network") comprises a first controller having a first attribute, and also initially comprises a first group of at least one mesh-network node ("node"), the first group not comprising the first controller, and wherein a second mesh network ("second network") comprises a second controller having a second attribute, and also initially comprises a second group of at least one node, the second group not comprising the second controller, a method comprising:

the first controller receiving a first message from a given node in the first group, the first message indicating that the given node in the first group received a first signal from a given node in the second group, the first signal comprising the second attribute, and the first message comprising the second attribute;

responsive to receiving the first message, the first controller comparing the first attribute with the second attribute;

as a result of comparing the first attribute with the second attribute, the first controller making a first determination that the first controller has a lower priority than the second controller;

responsive to making the first determination, the first controller no longer communicating with the first group, resulting in at least one node in the first group joining the second network;

wherein a particular node in the first group joining the second group comprises:

the particular node broadcasting a discovery message;

a node in the second group (i) detecting the discovery message and (ii) passing a second message to the second controller; and responsive to receiving the second message, the second controller authorizing the particular node to join the second network.

2. The method of claim 1, wherein the first message comprises the first signal.

3. The method of claim 1, further comprising, also responsive to making the first determination, the first controller powering down.

4. The method of claim 1, wherein the first controller no longer communicating with the first group comprises the first controller not responding to communications received from the first group.

5. The method of claim 1, wherein the at least one node in the first group joining the second network comprises all of the nodes in the first group joining the second network.

6. The method of claim 1, wherein a particular node in the first group joins the second network, the method further comprising:

the second controller receiving a second message from the particular node, the second message indicating that the particular node received communications from the first controller, the second message comprising the first attribute;

responsive to receiving the second message, the second controller comparing the second attribute with the first attribute;

as a result of comparing the second attribute with the first attribute, the second controller making a second determination that the second controller now has a lower priority than the first controller; and responsive to making the second determination, the second controller no longer communicating with either the second group or the first group, resulting in at least one of (a) at least one node in the first group rejoining the first network and (b) at least one node in the second group joining the first network.

7. The method of claim 1, wherein at least one of the first controller and the second controller comprises a wireless access point.

8. The method of claim 1, further comprising:

the second controller receiving a second message from the given node in the second group, the second message indicating that the given node in the second group received a second signal from the given node in the first group, the second message comprising the first attribute;

responsive to receiving the second message, the second controller comparing the second attribute with the first attribute; and as a result of comparing the second attribute with the first attribute, the second controller making a second determination that the second controller has a higher priority than the first controller.

9. The method of claim 1, wherein each of the first attribute and the second attribute comprises at least one of a priority level, a backhaul value, an uptime value, a signal-to-noise ratio, a carrier-to-cochannel interference ratio, and a hop count.

10. The method of claim 1, wherein the first attribute comprises a first numerical value, wherein the second network attribute comprises a second numerical value, and wherein the first controller making the first determination comprises the first controller determining that the first numerical value is less than the second numerical value.

11. The method of claim 1, wherein the first attribute comprises a first plurality of parameters, wherein the second attribute comprises a second plurality of parameters, and wherein the first controller comparing the first attribute with the second attribute comprises the first controller sequentially comparing parameters from the first plurality with corresponding parameters from the second plurality until identifying a difference between a parameter from the first plurality and a corresponding parameter from the second plurality.

12. In a communications system wherein a first mesh network ("first network") comprises a first controller having a first attribute, and also initially comprises a first group of at least one mesh-network node ("node"), the first group not comprising the first controller, and wherein a second mesh network ("second network") comprises a second controller having a second attribute, and also initially comprises a second group of at least one node, the second group not comprising the second controller, a method comprising:
- the first controller receiving a first message from a given node in the first group, the first message indicating that the given node in the first group received a first signal from a given node in the second group, the first signal comprising the second attribute, and the first message comprising the second attribute;
- responsive to receiving the first message the first controller comparing the first attribute with the second attribute;
- as a result of comparing the first attribute with the second attribute, the first controller making a first determination that the first controller has a lower priority than the second controller;
- responsive to making the first determination, the first controller directing at least one node in the first group to disassociate from the first network;
- wherein a particular node in the first group joining the second group comprises:
  - the particular node broadcasting a discovery message;
  - a node in the second group (i) detecting the discovery message and (ii) passing a second message to the second controller; and
  - responsive to receiving the second message, the second controller authorizing the particular node to join the second network.

13. The method of claim 12, further comprising the at least one node in the first group joining the second network.

14. The method of claim 13, further comprising upon the at least one node in the first group joining the second network, each of the other nodes in the first group also joining the second network.

15. The method of claim 12, further comprising, also responsive to making the first determination, the first controller directing the at least one node in the first group to join the second network.

16. The method of claim 15, wherein the at least one node in the first group initially stores first-network configuration data, wherein the at least one node in the first group initially utilizes the first-network configuration data to operate on the first network, and wherein the first controller directing the at least one node in the first group to join the second network comprises the first controller reconfiguring the at least one node in the first group to store second-network configuration data so as to enable the at least one node in the first group to operate on the second network.

17. The method of claim 12, further comprising:
- a particular node in the first group joining the second network;
- the second controller receiving a second message from the particular node, the second message indicating that the particular node received communications from the first controller, the second message comprising the first attribute;
- responsive to receiving the second message, the second controller comparing the second attribute with the first attribute;
- as a result of comparing the second attribute with the first attribute, the second controller making a second determination that the second controller now has a lower priority than the first controller; and
- responsive to making the second determination, the second controller directing the particular node to disassociate from the second network.

18. In a communications system wherein a first mesh network ("first network") comprises a first controller having a first attribute, and also initially comprises a first group of at least one mesh-network node ("node"), the first group not comprising the first controller and wherein a second mesh network ("second network") comprises a second controller having a second attribute, and also initially comprises a second group of at least one node, the second group not comprising the second controller, the first controller comprising:
- a communications interface operable to receive a first message from a given node in the first group, the first message indicating that the given node in the first group received a first signal from a given node in the second group, the first signal comprising the second attribute, and the first message comprising the second attribute;
- a processor; and
- data storage comprising programming instructions executable by the processor to:
- upon receiving the first message compare the first attribute with the second attribute;
- as a result of comparing the first attribute with the second attribute, make a determination that the first controller has a lower priority than the second controller;
- responsive to making the determination, no longer communicate with the first group, resulting in at least one node in the first group joining the second network;
- wherein a particular node in the first group joining the second group comprises:
  - the particular node broadcasting a discovery message;
  - a node in the second group (i) detecting the discovery message and (ii) passing a second message to the second controller; and
  - responsive to receiving the second message, the second controller authorizing the particular node to join the second network.

* * * * *